United States Patent [19]

Dix et al.

[11] 3,821,142

[45] June 28, 1974

[54] DYEABLE POLYOLEFINS

[75] Inventors: James S. Dix, Greenville; Ronald D. Mathis, Mauldin, both of S.C.; John H. Underwood, Charlotte, N.C.

[73] Assignee: Phillips Petroleum Company, Bartlesville, Okla.

[22] Filed: May 2, 1973

[21] Appl. No.: 356,533

Related U.S. Application Data

[63] Continuation of Ser. No. 160,135, July 6, 1971, abandoned.

[52] U.S. Cl............. 260/23 H, 8/180, 260/45.75 N, 260/94.9 GD, 252/182
[51] Int. Cl. ............................................ C08f 19/14
[58] Field of Search... 260/23 H, 45.75 N, 94.9 GD; 8/180; 252/182

[56] References Cited

UNITED STATES PATENTS

| | | | |
|---|---|---|---|
| 2,984,634 | 5/1961 | Caldwell et al. | 260/23 |
| 3,163,492 | 12/1964 | Thomas | 260/45.75 |
| 3,214,399 | 10/1965 | Saccomandi | 260/23 |
| 3,310,510 | 3/1967 | Breslow | 260/23 |

FOREIGN PATENTS OR APPLICATIONS

| | | | |
|---|---|---|---|
| 717,127 | 8/1965 | Canada | 260/23 |

*Primary Examiner*—M. J. Welsh

[57] ABSTRACT

The dyeability of polyolefins is enhanced by incorporating therein calcium stearate and nickel bis(O-ethyl-3,5-di-t-buty-4-hydroxybenzylphosphonate).

10 Claims, No Drawings

DYEABLE POLYOLEFINS

This application is a continuation of copending application Ser. No. 160,135, filed July 6, 1971, and now abandoned.

This invention relates to an additive system which improves the dyeability of polyolefins.

In one of its more specific aspects, this invention pertains to an additive system which, when incorporated in polyolefins, and particularly in polypropylene, increases the receptivity of the polyolefin to dyes.

It is known to incorporate nickel compounds into polypropylene to impart to the polymer improved initial color upon dyeing and to increase the resistance of the dyed polypropylene to fading. A wide variety of nickel compounds can be employed among which are the nickel carboxylates, preferably nickel stearate, and nickel bis(0-ethyl-3,5-di-t-butyl-4-hydroxybenzylphosphonate), the latter material being an organic nickel derivative of a monobasic or dibasic hindered phenol substituted phosphonic acid. While such nickel compounds have been used in the prior art for enhancing dyeability, it has now been determined that the inclusion of calcium stearate with the nickel compound improves the dye receptivity of the polymer in which the nickel compound is incorporated.

Accordingly, there is provided according to this invention an additive system for incorporation in polyolefin which comprises calcium stearate and at least one of a nickel carboxylate, and nickel bis(0-ethyl-3,5-di-t-butyl-4-hydroxybenzylphosphonate). In its preferred embodiment, the additive system of this invention will comprise calcium stearate, nickel stearate and nickel bis(0-ethyl-3,5-di-t-butyl-4-hydroxybenzylphosphonate).

The additive system of this invention is incorporated in the polymer in such an amount that the nickel compound or compounds are included in an amount from about 0.3 to about 2.0 parts per hundred parts of the polymer by weight and the calcium stearate is incorporated in the polypropylene in an amount within the range of from about 0.1 to about 0.5 parts per hundred parts of polymer by weight.

Other additives such as phenolic antioxidants, fillers, pigments, UV stabilizers, can also be incorporated in the polymer, with the additive system being applicable with those dyes customarily employed in the dyeing of polymers.

In general, the additive system of this invention will be comprised of calcium stearate in an amount from about 10 to about 25 weight percent with the nickel compound or compounds comprising from about 75 to about 90 weight percent of the additive system. In the preferred embodiment previously defined, the calcium stearate comprises an amount of about 18.7 weight percent, the nickel stearate an amount of about 62.5 weight percent and the nickel complex an amount of about 18.7 weight percent.

The following data indicate the effect of incorporating the calcium stearate (CaSt) additive system of this invention in polymer compositions. In all instances the polymer was a 12 melt flow polypropylene containing a small percentage of a phenolic antioxidant. The nature of the nickel-containing compound included was varied with "NiSt" indicating nickel stearate, and "nickel bis" indicating nickel bis(0-ethyl-3,5-di-t-butyl-4-hydroxybenzylphosphonate). Polypropylene fabric or carpet knitted from fiber spun from compositions containing the additive systems noted were printed with commercially available chelatable (metallizable) red, yellow or blue disperse dyes according to methods known in the art. Properties of the polypropylenes in terms of depth of printing were visually determined, the lower numbers indicating the deeper depth of printing. Results were as follows:

| Run No. | Parts/100 Parts Polymer | | | | Relative Depth of Printing | |
|---|---|---|---|---|---|---|
| | CaSt | NiSt | Nickel Bis | Benz* | Yellow | Red |
| 1 | 0.1 | 1.0 | 0.3 | 0 | 2 | 6 |
| 2 | 0.2 | 1.0 | 0.3 | 0 | 1 | 5 |
| 3 | 0.1 | 1.0 | 0.5 | 0 | 5 | 4 |
| 4 | 0.1 | 1.0 | 0 | 0.3 | 6 | 3 |
| 5 | 0.2 | 1.0 | 0 | 0.3 | 3 | 1 |
| 6 | 0.1 | 1.0 | 0 | 0.5 | 4 | 2 |

Data showing the various materials employed in their most advantageous quantities are as follows:

| Printing Run No. | Parts/100 Parts Polymer | | | | Relative Depth of | | |
|---|---|---|---|---|---|---|---|
| | | | | | Carpets | | Knits |
| | CaSt | NiSt | Nickel Bis | Benz* | Yellow | Red | Yellow |
| 7 | 0.3 | 1.0 | 0.3 | 0 | 2 | 1 | 2 |
| 8 | 0.3 | 1.3 | 0.3 | 0 | 1 | 2 | 1 |
| 9 | 0.3 | 1.0 | 0.5 | 0 | 3 | 3 | 3 |
| 10 | 0.3 | 1.0 | 0 | 0.3 | 5 | 5 | 4 |
| 11 | 0.3 | 1.0 | 0 | 0.5 | 4 | 4 | 5 |

*2-hydroxy-4-octoxybenzophenone

The above data indicate the improvement in depth of printing with increasing quantities of calcium stearate within the ranges defined in the presence of the nickel compounds previously defined.

That the incorporation of calcium stearate in the polymer produces an improvement in the depth of printing attainable in polypropylene is shown by the following data in which, of the nickel compounds comprising the additive composition of the invention, only nickel stearate was employed. The polypropylene was as previously described and contained dioctyl phosphite and a hindered phenol in equal quantities in both blends.

| Parts/100 Parts Polymer | | Depth of Printing | |
|---|---|---|---|
| CaSt | NiSt | Yellow | Red |
| 0 | 1.0 | 2 | 2 |
| 0.3 | 1.0 | 1 | 1 |

The above data indicate the improvement in depth of printing attainable by the inclusion of calcium stearate in polymers.

It will be evident that various modifications can be made to the method of this invention. However, such are considered to be within the scope of the invention.

What is claimed is:

1. A dyeable polymeric composition comprising a polyolefin having incorporated therein calcium stearate, nickel stearate and nickel bis(0-ethyl-3,5-di-t-butyl-4-hydroxybenzylphosphonate), said calcium stearate being present in the range of about 0.1 to about 0.5 part per 100 parts of the polyolefin by weight, the total of said nickel stearate and nickel bis(-0-ethyl-3,5-di-t-butyl-4-hydroxybenzylphosphonate) being in the range of about 0.3 to about 2.0 parts per 100 parts of the polyolefin by weight, and said calcium stearate being in the range of about 10 to about 25 weight percent of the total of said calcium stearate, nickel stearate and nickel bis(0-ethyl-3,5-di-t-butyl-4-hydroxybenzylphosphonate).

2. The composition of claim 1 wherein said polyolefin is polypropylene.

3. The composition of claim 2 wherein said calcium stearate comprises about 0.3 part per 100 parts of the polypropylene by weight, said nickel stearate comprises about 1.0 part per 100 parts of the polypropylene by weight, and said nickel bis(0-ethyl-3,5-di-t-butyl-4-hydroxybenzylphosphonate) comprises about 0.3 part per 100 parts of the polypropylene by weight.

4. The composition of claim 2 wherein said calcium stearate comprises about 0.3 part per 100 parts of the polypropylene by weight, said nickel stearate comprises about 1.3 parts per 100 parts of the polypropylene by weight, and said nickel bis(0-ethyl-3,5-di-t-butyl-4-hydroxybenzylphosphonate) comprises about 0.3 part per 100 parts of the polypropylene by weight.

5. The composition of claim 2 wherein said calcium stearate comprises about 0.3 part per 100 parts of the polypropylene by weight, said nickel stearate comprises about 1.0 part per 100 parts of the polypropylene by weight, and said nickel bis(0-ethyl-3,5-di-t-butyl-4-hydroxybenzylphosphonate) comprises about 0.5 part per 100 parts of the polypropylene by weight.

6. The method of producing a dyed polyolefin fiber which comprises incorporating into a polyolefin calcium stearate, nickel stearate and nickel bis(0-ethyl-3,5-di-t-butyl-4-hydroxybenzylphosphonate), said calcium stearate being present in the range of about 0.1 to about 0.5 part per 100 parts of the polyolefin by weight, the total of said nickel stearate and nickel bis(-0-ethyl-3,5-di-t-butyl-4-hydroxybenzylphosphonate) being in the range of about 0.3 to about 2.0 parts per 100 parts of the polyolefin by weight, and said calcium stearate being in the range of about 10 to about 25 weight percent of the total of said calcium stearate, nickel stearate and nickel bis(0-ethyl-3,5-di-t-butyl-4-hydroxybenzylphosphonate); spinning fiber from the resulting polyolefin composition; and dyeing the resulting fiber.

7. The method of claim 6 wherein said polyolefin is polypropylene.

8. The method of claim 7 wherein said calcium stearate comprises about 0.3 part per 100 parts of the polypropylene by weight, said nickel stearate comprises about 1.0 part per 100 parts of the polypropylene by weight, and said nickel bis(0-ethyl-3,5-di-t-butyl-4-hydroxybenzylphosphonate) comprises about 0.3 part per 100 parts of the polypropylene by weight.

9. The method of claim 7 wherein said calcium stearate comprises about 0.3 part per 100 parts of the polypropylene by weight, said nickel stearate comprises about 1.3 part per 100 parts of the polypropylene by weight, and said nickel bis(0-ethyl-3,5-di-t-butyl-4-hydroxybenzylphosphonate) comprises about 0.3 part per 100 parts of the polypropylene by weight.

10. The method of claim 7 wherein said calcium stearate comprises about 0.3 part per 100 parts of the polypropylene by weight, said nickel stearate comprises about 1.0 part per 100 parts of the polypropylene by weight, and said nickel bis(0-ethyl-3,5-di-t-butyl-4-hydroxybenzylphosphonate) comprises about 0.5 part per 100 parts of the polypropylene by weight.

* * * * *